Nov. 20, 1945.  E. CADIEUX  2,389,411

ROOT HARVESTING MACHINE

Filed March 15, 1944

INVENTOR
EUDORE CADIEUX

BY
L. S. Mitchell
ATTORNEY

Patented Nov. 20, 1945

2,389,411

UNITED STATES PATENT OFFICE 2,389,411

ROOT HARVESTING MACHINE

Eudore Cadieux, Letellier, Manitoba, Canada

Application March 15, 1944, Serial No. 526,604

2 Claims. (Cl. 198—9)

My invention relates to root harvesters, more particularly having reference to a machine for gathering and loading sugar beets and other roots or material from the ground to a vehicle.

In the art to which the invention relates it has been proposed to provide root harvesting machines in which a conveyor is used in conjunction with root digging or gathering elements for receiving and delivering roots or other matter to a wagon or vehicle from the ground. In these the conveyor is more usually disposed lengthwise of the machine with the digging or gathering elements in advance of the conveyor.

The present invention contemplates improvements in machines of this character by provision of a new and novel arrangement of gathering elements and conveyor.

To this end I provide a conveyor system disposed transversely of the direction of travel of the machine. Associated with the conveyor system is an element for initially gathering the material and means for shifting the material from the gathering element to the conveyor.

One of the objects of the invention is accordingly to provide a material harvesting machine with improved gathering element by which loose material may be lifted from the ground and avoiding entanglements of weeds and similar matter.

A further object of the invention is to provide in combination with the gathering element improved means for shifting the gathered material to a conveyor.

A still further object of the invention is to provide an improved arrangement of gathering element, conveyor and shifting means between the gathering element and conveyor.

A still further object of the invention is to provide a machine of this character capable of construction to accommodate any desired accumulation of material.

Other features and advantages of the invention will become apparent by reference to the accompanying description taken in conjunction with the drawing wherein like characters of reference indicate like parts throughout the several views and wherein.

Figure 1:
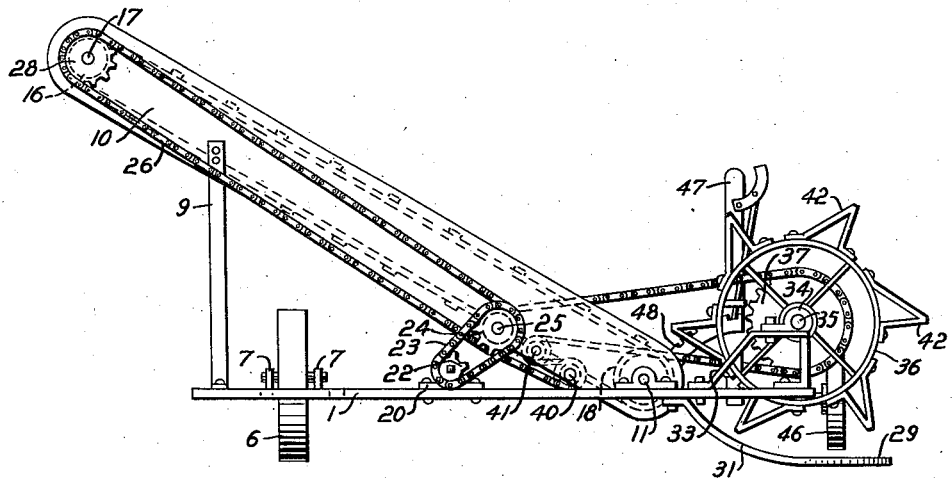
Fig. 1 is a front elevation of the machine assembled.
Figure 2:
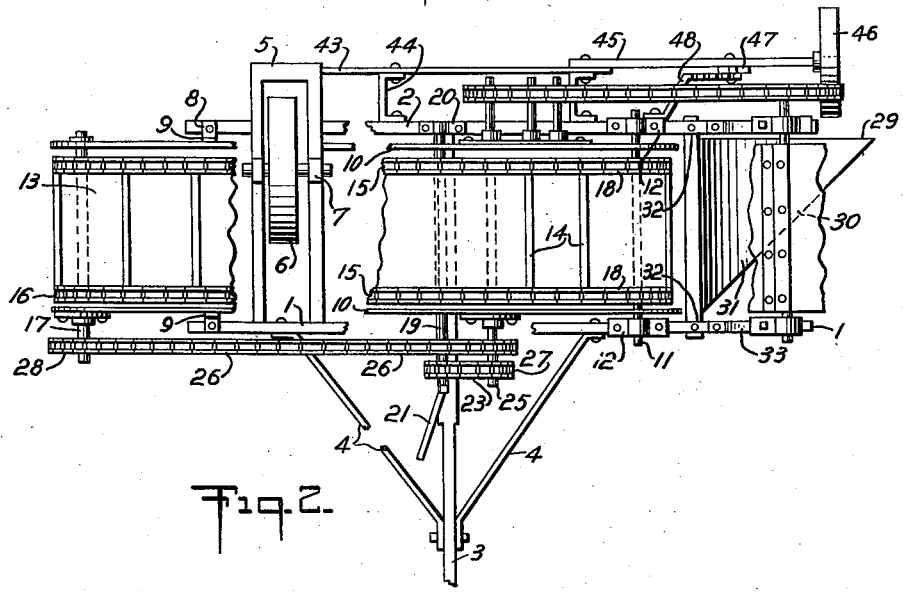
Fig. 2 is a top plan view of same, the device being shown partly broken away for convenience of illustration.
Figure 3:
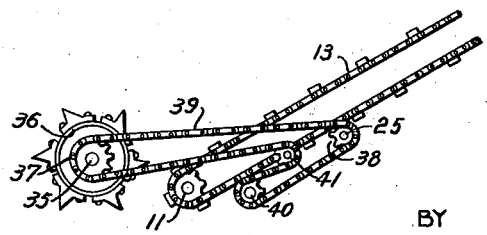
Fig. 3 is a side view of the driving connection for the material shifting element and indicating a fragment of the conveyor.

Having reference to the drawing my root harvesting machine is designed to be drawn by a tractor or like power driven machine and from which power may be derived for driving the loading mechanism.

The machine provides main horizontal frame bars 1 and 2 connected intermediately by a tongue or pole 3 that would forwardly be connectable to a tractor. The pole 3 is braced by rods 4 connecting thereto and to the side bar 1.

At one end of the frame bars is provided traction means comprising a cross bar frame member 5 that attaches to the frame bar 1 and to the bar 2 and mounts a wheel 6 in a suitable axle mounted for rotation in bearing elements 7. The frame member 5 projects rearwardly of the bar 2 to provide a balanced support for the machine.

Rearwardly of the member 5 is a cross bar 8 with integral standards 9 for supporting the delivery end of the conveyor. The conveyor consists of a pair of side bars 10 that are supported at the rear or delivery end by attachment to the standards 9.

At the receiving end of the conveyor the boards 10 are carried loose on a shaft 11, said shaft being mounted rotatable in bearing members 12 on the frame bars 1 and 2.

The conveyor consists of an endless canvas or belt 13 with cleats 14 at intervals. The cleats 14 attach to endless chains 15 trained at the upper end over sprockets 16 on a shaft 17 mounted for rotation in the side boards 10. At the lower end the chains 15 are trained over sprockets 18 on the shaft 11.

For driving the conveyor there is provided a driving shaft 19 rotating in bearing members 20 on the frame bars 1 and 2. The shaft 19 includes a coupling with connecting rod 21 for a driven connection to the tractor. On the shaft 19 is fixed a sprocket wheel 22 with chain 23 forming a driving connection with a sprocket wheel 24 on a shaft 25 mounted for rotation in suitable bearing members in the side boards 10. A further chain 26 is trained over wheels 27 and 28 on the shafts 25 and 17 providing the driving connection for operation of the conveyor.

To the under side of the frame bars 1 and 2 is attached the root engaging element. This consists of a plate 29 designed for travel in intimate relation to the ground to engage and lift the roots into position for transfer to the conveyor.

The plate 29 provides a diagonal working face 30 that allows weed and other foreign accumulations to pass beyond the plate without entanglement. The rearward portion 31 of the plate bends upward as more clearly apparent by reference to Figure 1 and terminates in lugs 32 for attachment by bolting to the under side of frame bars 1 and 2.

Above the plate 29 is mounted a rotating element for effecting movement of the material laterally from the plate 29 to the conveyor. On the frame bars 1 and 2 are brackets 33 providing bearing members 34 mounting for rotation an axle 35 on which is fixed a drum or cylinder 36. The axle 35 has keyed thereon a sprocket wheel 37 by which the axle may be driven. Aligned with the wheel 37 is a further sprocket wheel 38 on the shaft 25, the driving connection being by chain 39. Stub shafts 40 and 41 on the rear frame board 10 carry idler sprockets over which the chain 39 is trained.

To the drum 36 is attached a series of lugs 42 for engagement of the roots on the plate 29 to shift the roots or material gathered to the conveyor by rotation of the drum 36.

In the operation of the machine the roots or material to be gathered is first accumulated in windrows along which the machine passes. The machine is capable of handling eight rows of beets to a windrow. This could be increased if necessary by increasing the size of the plate 29 and drum 36. The plate 29 will operate successfully over either hard or soft ground and is capable of gathering various roots besides sugar beets, such as turnips, onions, potatoes, carrots, and the like, or for gathering stones, manure and other material, or even grain.

The gathered material is shifted from the plate 2 to the conveyor belt by the rotating drum 36, the lugs 42 moving the material over the plate 29 to the conveyor belt 13, for transfer and discharge off the delivery end of the conveyor to a wagon or truck.

For travel of the machine when not in use or operation a second traction wheel is provided. For the second wheel an auxiliary frame bar 43 is carried by the frame member 5 and auxiliary frame members 44 attached to the frame bar 2. To the frame bar 43 is intermediately hinged a bar 45 carrying a wheel 46 and engaged by an elevating gear comprising a lever 47 with quadrant 48 by which the receiving end of the main frame can be raised to be supported for travel of the machine when not gathering materials.

While I have herein described a preferred embodiment of my invention changes in construction and arrangement of parts and elements may be effected without departure from the spirit and scope of the invention as defined in the appended claims.

What I claim and wish to secure by Letters Patent is:

1. In a machine of the character described an element for initially gathering the material, said element comprising a plate having a flat material gathering section for travel above and in horizontal relation to the ground and an integral upwardly curved delivery section, said plate being mounted with its gathering section projecting laterally of the machine and delivering inward, an elevating conveyor carried by the machine transversely disposed and located in continuing relation to the delivery end of the plate, and a rotatable material moving element mounted above the plate, said element including material engaging members adapted on rotation of said element to effect a continuing movement of material laterally over the plate on to the conveyor.

2. A machine of the character described including a wheel supported frame, an elevating conveyor transversely disposed in the frame, a material gathering element carried by the frame projecting laterally therefrom in continuing relation to the conveyor, said element providing a flat gathering section adapted for travel above and in horizontal relation to the ground and an integral upwardly turned delivery section extending in discharging relation to the conveyor, said plate having its forward edge receding from the inner forward portion outwardly, means for effecting continuous movement of material laterally across the plate on to the conveyor, means connectable to a source of power for driving the conveyor and material moving means, and manually operable means for elevation of the receiving side of the machine.

EUDORE CADIEUX.